(12) United States Patent
Hoskins (10) Patent No.: US 8,607,895 B2
(45) Date of Patent: Dec. 17, 2013

(54) DRILLING FLUID ADDITIVE FOR REDUCING LOST CIRCULATION IN A DRILLING OPERATION

(75) Inventor: Terry W Hoskins, Calgary (CA)

(73) Assignee: Canadian Energy Services, LP, Calgary (CA)

(*) Notice: Subject to any disclaimer, the term of this patent is extended or adjusted under 35 U.S.C. 154(b) by 724 days.

(21) Appl. No.: 12/667,952

(22) PCT Filed: Jul. 4, 2008

(86) PCT No.: PCT/CA2008/001237
§ 371 (c)(1),
(2), (4) Date: Jan. 6, 2010

(87) PCT Pub. No.: WO2009/006731
PCT Pub. Date: Jan. 15, 2009

(65) Prior Publication Data
US 2010/0193244 A1    Aug. 5, 2010

Related U.S. Application Data

(60) Provisional application No. 60/958,500, filed on Jul. 6, 2007.

(51) Int. Cl.
*E21B 7/00* (2006.01)
*E21B 33/13* (2006.01)
*C09K 8/02* (2006.01)

(52) U.S. Cl.
USPC ............ 175/72; 175/5; 175/65; 166/358; 166/285; 166/292; 166/305.1; 507/104; 507/126; 507/138

(58) Field of Classification Search
USPC .......... 175/5, 65, 72, 207; 166/358, 285, 292; 507/104, 126, 138
See application file for complete search history.

(56) References Cited

U.S. PATENT DOCUMENTS

| | | | | |
|---|---|---|---|---|
| 2,846,390 A | * | 8/1958 | Lummus et al. | 507/104 |
| 2,935,472 A | * | 5/1960 | Klaas et al. | 507/104 |
| 3,223,185 A | * | 12/1965 | Van Lingen et al. | 175/65 |
| 3,302,719 A | * | 2/1967 | Fischer | 166/280.2 |
| 3,316,965 A | * | 5/1967 | Watanabe | 166/280.1 |

(Continued)

FOREIGN PATENT DOCUMENTS

| | | |
|---|---|---|
| CA | 1063928 | 10/1979 |
| CA | 1267075 | 3/1990 |

(Continued)

OTHER PUBLICATIONS

Suyan et al., "Novel Cement Composition for Completion of Thermal Recovery (ISC) Wellbores", SPE/IADC 101848, pp. 1-6.

(Continued)

*Primary Examiner* — Matthew Buck
(74) *Attorney, Agent, or Firm* — Diederiks & Whitelaw, PLC (57) ABSTRACT

Generally, the present invention provides drilling fluid additives for reducing or controlling lost circulation in a drilling operation. The additives comprises particles. The particles comprise one or more solids in association a wax or waxy substance. A drilling fluid comprising a drilling fluid additive of the invention is also provided, as well as a method and use of the drilling fluid additive in a drilling operation to reduce or control lost circulation. Methods for manufacturing the drilling fluid additives are also described.

18 Claims, 4 Drawing Sheets

(56) References Cited

U.S. PATENT DOCUMENTS

| | | | |
|---|---|---|---|
| 3,342,263 A | | 9/1967 | Fischer |
| 3,455,390 A | * | 7/1969 | Gallus ............................ 166/295 |
| 3,509,951 A | * | 5/1970 | Enochs ............................ 175/70 |
| 3,593,794 A | * | 7/1971 | Fischer et al. ................. 166/283 |
| 3,601,194 A | * | 8/1971 | Gallus ............................ 166/283 |
| 3,625,892 A | * | 12/1971 | Watanabe ...................... 507/203 |
| 3,630,280 A | * | 12/1971 | Fischer et al. ................. 166/283 |
| 3,684,012 A | * | 8/1972 | Scheffel et al. ................ 166/283 |
| 3,711,405 A | * | 1/1973 | Pye et al. ....................... 507/203 |
| 3,717,204 A | | 2/1973 | Scheffel et al. |
| 3,753,903 A | * | 8/1973 | Fischer et al. ................. 507/114 |
| 3,870,668 A | * | 3/1975 | Fischer et al. ................. 507/116 |
| 3,882,225 A | * | 5/1975 | Fischer et al. ................. 507/213 |
| 3,918,523 A | * | 11/1975 | Stuber ............................ 166/285 |
| 3,954,629 A | | 5/1976 | Scheffel et al. |
| 3,979,304 A | * | 9/1976 | Fischer et al. ................. 507/103 |
| 3,979,305 A | * | 9/1976 | Fischer et al. ................. 507/103 |
| 3,989,632 A | * | 11/1976 | Fischer et al. ................. 507/107 |
| 4,005,753 A | | 2/1977 | Scheffel et al. |
| 4,036,301 A | | 7/1977 | Powers et al. |
| 4,192,753 A | * | 3/1980 | Pye et al. ....................... 507/103 |
| 4,582,091 A | | 4/1986 | Ells |
| 4,614,599 A | * | 9/1986 | Walker ........................... 507/103 |
| 4,643,255 A | | 2/1987 | Sandiford et al. |
| 4,664,816 A | * | 5/1987 | Walker ........................... 507/103 |
| 4,671,883 A | | 6/1987 | Connell et al. |
| 4,704,213 A | * | 11/1987 | Delhommer et al. ........... 175/72 |
| 4,770,796 A | | 9/1988 | Jacobs |
| 5,763,367 A | * | 6/1998 | Burts, Jr. ........................ 507/104 |
| 6,059,036 A | * | 5/2000 | Chatterji et al. ............... 166/294 |
| 6,187,719 B1 | * | 2/2001 | Dino et al. ..................... 507/129 |
| 6,258,756 B1 | * | 7/2001 | Hayatdavoudi ............... 507/145 |
| 6,803,347 B1 | | 10/2004 | Ladva et al. |
| 7,063,151 B2 | * | 6/2006 | Nguyen et al. ............. 166/280.2 |
| 7,402,338 B2 | * | 7/2008 | Weintritt et al. .............. 428/403 |
| 7,705,099 B2 | * | 4/2010 | Hoskins ......................... 527/103 |
| 8,235,119 B2 | * | 8/2012 | Hoskins ......................... 166/310 |
| 2002/0142919 A1 | | 10/2002 | Constien |
| 2006/0122071 A1 | | 6/2006 | Reddy et al. |
| 2006/0166838 A1 | * | 7/2006 | Collins et al. .................. 507/219 |
| 2006/0276345 A1 | | 12/2006 | Todd et al. |
| 2007/0054121 A1 | * | 3/2007 | Weintritt et al. .............. 428/403 |
| 2010/0173805 A1 | * | 7/2010 | Pomerleau ..................... 507/138 |

FOREIGN PATENT DOCUMENTS

| | | |
|---|---|---|
| CA | 2161799 | 10/1994 |
| CA | 2583484 | 12/2008 |
| GB | 1579356 | 11/1980 |
| WO | 02/12674 | 2/2002 |
| WO | 2007/107015 | 9/2007 |

OTHER PUBLICATIONS

Fischer et al., "An Organic 'Clay Substitute' for Nondamaging Water Base Drilling and Completion Fluids", Society of Petroleum Engineers of Aime, SPE 4651.

Gallus et al., "Fluid Diversion to Improve Well Stimulation", American Institute of Mining, Metallurgical and Petroleum Engineers, Inc., SPE 3811.

* cited by examiner

DRILLING FLUID ADDITIVE FOR REDUCING LOST CIRCULATION IN A DRILLING OPERATION

CROSS-REFERENCE TO RELATED APPLICATIONS

This application represents a National Stage application of PCT/CA2008/001237 entitled "Drilling Fluid Additive for Reducing Lost Circulation in a Drilling Operation" filed Jul. 4, 2008, pending, which claims the benefit of U.S. Provisional Patent Application Ser. No. 60/958,500, filed Jul. 6, 2007.

FIELD OF THE INVENTION

The present invention relates generally to drilling operations. More particularly, the present invention relates to a drilling fluid additive for reducing lost circulation in a drilling operation.

BACKGROUND OF THE INVENTION

There are various operations in which drilling is performed, including oil and gas drilling operations and mining operations.

In the process of drilling a well into a subterranean formation, drilling fluid or "mud" is pumped into the developing well bore through the drill pipe and exits through nozzles in the rotating drill bit mounted at the end of the drill pipe. The drilling fluid is then circulated back to the surface through the annulus, the space between the drill pipe and the wall of the well bore. Back at the surface, solids are removed and the mud is generally pumped to a fluid tank where it can be reused or treated. The drilling fluid system is typically designed as a loop with the drilling fluid continually circulating as the drill bit rotates. Drilling fluid performs several important functions and enhances the overall efficiency of the drilling operation. Drilling fluid is used, for instance, to cool and lubricate the rotating drilling tool, to reduce friction, to prevent sticking of the drill pipe, to control subsurface pressure, to suspend and deliver treatment additives, to lift the drill cuttings and carry them to the surface, and to clean the well bore and drilling tool.

A major component of drilling fluid is its base fluid. A drilling fluid may be aqueous based, hydrocarbon based, synthetic based, or an emulsion, such as an oil-in-water or water-in-oil ("invert") emulsion. Aqueous based, or water based, drilling fluids are used frequently in the industry and provide an economic advantage over oil based drilling fluids. They are also considered more environmentally friendly. Drilling with aqueous based fluids can be problematic in certain formations however, due to hydration and swelling of water-absorbing rock and clay in the formation leading to instability of the well bore. Such hydration and instability can be reduced by using an oil based drilling fluid. Although oil based fluids are more costly than aqueous based fluids, they are generally preferred for deep drilling, high temperature drilling or when a substantially non-reactive base fluid is required for a particular drilling operation or formation.

When drilling into a porous or fractured formation, a portion of the drilling fluid or its base fluid may be lost to the formation surrounding the well bore and is not returned to the surface for recirculation. This lost portion of drilling fluid is commonly referred to as lost circulation. Areas of a formation where losses occur are referred to as loss zones or thief zones. Lost circulation has a negative impact on the drilling procedure and also has a significant economic impact on the operation. Lost circulation can also increase the environmental impact of the operation, particularly when drilling with hydrocarbons. The amount and type of lost circulation experienced depends on the structure and permeability of the formation being drilled as well as the properties of the drilling fluid.

Lost circulation may occur in the form of seepage losses or fluid losses. Seepage losses occur when whole mud, including solids, is lost to the formation during drilling. This can occur when solids in the drilling fluid are not large enough to bridge the pores or fractures in the formation. Fluid loss refers to loss of fluid to an area of a formation where a filter cake is formed or where solids cannot pass, resulting primarily in loss of the base fluid to the formation. Even mild to moderate losses can have a significant impact on the cost of drilling. Severe or total losses may be experienced in highly porous or fractured formations.

Lost circulation can be reduced or controlled to varying degrees by adding foreign solids to the fluid. A solid that is added to a drilling fluid to reduce or control lost circulation is generally referred to as a lost circulation material (LCM). In the field, operators have been known to add a wide range of solids to their fluid systems in an attempt to reduce or control lost circulation, including nut hulls, pieces of rubber tires, dried tumbleweed, paper, and even plastic bags. Conventional lost circulation materials include sawdust, wood fibers, gilsonite, asphalt, asphaltenes, cellulosic materials, plastics, cellophane, calcium carbonate, water soluble polymers and various thickening and gelling agents. Gilsonite, fibrous materials and calcium carbonate are often used to control heavier seepage losses. Various polymers or fine solids are generally added to the drilling fluid to control fluid losses, or to control the thickness of the filter cake created and the amount of filtrate to the formation. Lost circulation materials are often ground or blended to different particle sizes based on the expected structure of the formation and anticipated severity of lost circulation, and are intended to either plug loss zones in the formation with solids or polymers or to build up a mat of solids to seal off the loss zones.

The available lost circulation materials have not proven entirely satisfactory and improved lost circulation materials are desired. Lost circulation materials can have a variety of disadvantages. A significant amount of solid material is often required to control lost circulation and the presence of these solids can cause difficulties in maintaining the desired chemical or physical properties of the drilling fluid, such as yield point, density, surface tension, viscosity or emulsion stability. Oil wetting chemicals must typically be added to ensure the solids are oil wet when drilling with a hydrocarbon drilling fluid, thereby adding chemicals to the fluid. A mat of fine solids can be difficult to keep in place downhole due to the movement of the drill string in the well bore and the annular velocity of the pumping fluid. Many of the available solid additives are not easily removable from the formation and can cause permanent damage. In an oil or gas drilling operation, a significant problem associated with the use of solid lost circulation materials is a permanent damaging effect on production zones of a formation which hinders production of the resource. The use of solid additives can also cause mechanical problems in the drilling rig equipment, such as the fluid pumps and solids control equipment.

U.S. Pat. No. 3,455,390 to Union Oil Company of California discloses a method of treating a well to temporarily seal off a drilled well bore prior to production. Finely-divided (i.e. 1 to 50 micron) oil-soluble wax particles are dispersed in an aqueous treatment fluid, which is then pumped into the drilled well to seal off the formation until the well is brought to production. The fine wax particles are designed such that they will dissolve within 24 to 48 hours in the hydrocarbon present at oil bearing zones of the formation to allow the well to come to production. Surface active agents and emulsifiers are added to aid in dispersion and control the fine particle size. The presence of dissolved wax, surface active agents, emulsifiers and various dissolved polymers in the fluid system impacts the properties of the treatment fluid and renders the fluid expensive to manufacture and maintain. It can also render the fluid system ineligible for full disposal which adds to the cost of completing the operation. Since the additives are oil soluble, they are not suitable for drilling with oil based drilling fluids as they will dissolve in the fluid before completion of the drilling operation. The oil soluble particles also have the potential to contaminate the formation and the production fluid.

U.S. Pat. Nos. 3,302,719, 3,455,390, 3,593,794, 3,601,194, 3,625,892, 3,630,280, 3,684,012, 3,717,204, 3,870,668, 3,882,029, 3,979,304, 3,979,305, 3,989,632 and 4,192,753, also to Union Oil Company of California, disclose variations on their oil-soluble additives for treatment fluids, comprising combinations of wax, resins, polymers, copolymers, surface active agents and emulsifiers for temporarily sealing off an underground formation surrounding a well bore. These additives have the disadvantages set out above.

Other drilling fluid additives comprising wax have been reported wherein reactive materials, such as hydrolytically degradable or swellable materials, are encapsulated in a removable or permeable wax casing to prevent or control the reaction of the core reactive material with its substrate until it has reached a desired location in the formation. The wax casing is designed such that it will melt or dissolve downhole in order to release the functional component of the additive. Examples of reactive materials encapsulated in a removable wax coating are described, for example, in U.S. Patent Publication No. 2006/0276345 to Todd et al., U.S. Patent Publication No. 2006/0122071 to Reddy et al., U.S. Pat. No. 7,063,151 to Nguyen et al., U.S. Pat. No. 4,036,301 to Powers et al., and U.S. Pat. No. 4,770,796 to Jacobs. These references are not directed to additives for controlling lost circulation of drilling fluids.

U.S. Pat. No. 4,704,213 to Delhommer et al., U.S. Pat. No. 4,664,816 to Walker, and U.S. Pat. No. 4,614,599 to Walker, relate to encapsulation of reactive lost circulation materials in a removable casing to protect the encapsulated materials from reacting for a period of time in the well bore. The reactive lost circulation materials are either oil-absorbable or water-absorbable polymers or reactive lime. The removable encapsulating material may be a wax that melts or dissolves downhole to release the active component, thereby allowing the polymers to swell upon contact with the fluid or permitting the lime to react with clays in the formation to form a cement-like product to control losses. The removable wax casing merely serves as a temporary encapsulant for the reactive lost circulation materials inside and does not itself serve as a lost circulation material. The reactive materials used are considered damaging to the formation.

Lost circulation of drilling fluid is one of the most serious and expensive problems facing the drilling industry today. It is, therefore, desirable to provide improved drilling fluid additives for reducing or controlling lost circulation to underground formations during drilling operations. Particularly preferred are drilling fluid additives that are effective yet simple and economical in manufacture and use. Additives that minimize damage to the underground formation or the environment are particularly preferred, as are additives that do not hinder the eligibility of the drilling fluid for full disposal upon completion of the operation. It is also desirable to reduce the number of different additives that must be used in a drilling system order to successfully complete the operation.

SUMMARY OF THE INVENTION

It is an object of the present invention to obviate or mitigate at least one disadvantage associated with previous lost circulation materials or to improve the performance thereof.

In one aspect, the present invention provides a drilling fluid additive for reducing or controlling lost circulation in a drilling operation. The additive has particles comprising one or more solids in association with a wax or waxy substance.

In another aspect, there is provided a use of the drilling fluid additive of the invention for reducing or controlling lost circulation during a drilling operation.

In another aspect, there is provided a drilling fluid comprising a drilling fluid additive of the invention.

In another aspect, there is provided a method of reducing or controlling lost circulation in a drilling operation. The method comprises providing a drilling fluid, the drilling fluid comprising a drilling fluid additive of the invention; and pumping the drilling fluid downhole during the drilling operation.

The drilling fluid additives of the invention are suitable for use in various drilling operations, including but not limited to vertical, directional and horizontal drilling operations. In some embodiments, the drilling fluid additive is suitable for use in offshore drilling operations where strict safety standards must be met.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides drilling fluid additives for reducing or controlling lost circulation in a drilling operation. The additives comprises particles. The particles comprise one or more solids in association a wax or waxy substance. A drilling fluid comprising a drilling fluid additive of the invention is also provided, as well as a method and use of the drilling fluid additive in a drilling operation to reduce or control lost circulation. Methods for manufacturing the drilling fluid additives are also described.

U.S. patent application Ser. No. 11/729,775 to the present inventor, incorporated herein by reference, discloses drilling fluid additives for reducing or controlling lost circulation in a drilling operation. The additives comprise solid wax or waxy particles that are substantially insoluble in hydrocarbons below their melt point. Particles of different size may be combined such that smaller particles are available to enter smaller pores and fractures in the formation while larger particles will bridge pores and fractures, thereby sealing off loss zones in the formation. Particles composed of different wax types may be combined to take advantage of different wax properties, such as melt point, hardness and blocking ability. The wax particles block together downhole to form a hydrophobic barrier on the wellbore wall. In addition to reducing losses, the hydrophobic barrier can reduce hole instability caused by the hydration of clays and clay type solids in the formation when drilling with an aqueous based fluid. The barrier can also reduce contamination of the oil-bearing formation by controlling the amount of damaging solids that can pass into the formation from the drilling fluid. As an added advantage, the presence of wax particles in the filter cake can enhance filter cake stability, in part due to the blocking ability of the wax, and can increase adherence of the filter cake to the wellbore wall to maintain loss control even as differential pressures are reversed during the operation due to the movement of the drill string in an out of the well bore. Since the wax selected is substantially insoluble in hydrocarbons at temperatures below melt point, the additive is suitable for drilling with hydrocarbon based fluids and does not permanently contaminate formation hydrocarbons. Also, if a wax is selected that will melt when the formation heats up to geothermal temperature upon completion of drilling, the additive will be removable from the formation with the assistance of geothermal heat.

While these additives are effective for controlling losses during drilling, they tend to be more expensive than certain other traditional lost circulation materials due to the cost of the raw materials. However, the non-damaging and non-contaminating nature of the wax particles and the ability for geothermal removal from the formation, as well as their reduced environmental impact compared to other additives, renders these additives highly advantageous and desirable in the industry.

The present inventor has now surprisingly discovered that one or more solids can be brought into association with a wax or waxy substance to produce new and improved drilling fluid additives for reducing or controlling lost circulation in a drilling operation. The wax or waxy substance imparts onto the new particles one or more of the advantageous features of the wax additives described above, such as blocking ability, malleability, selective softening point or melt point, or the capability for geothermal removal of the additive from the formation, and can therefore improve the performance of the chosen solid as a lost circulation material. The presence of wax or waxy substance in the additive can also render the particles less damaging to the formation, and more easily removable therefrom, compared to the solid particulate alone. The presence of one or more solids in the particles can increase the tensile strength of the new additive compared to wax particles alone and, in many cases, reduces the cost of the additive thereby providing a significant economical advantage to drilling operators. In some cases, the particles comprising solids and wax were found to seal off loss zones faster than either the solids alone or wax particles alone. This is an advantage since the creation of a fast seal at a loss zone not only prevents lost circulation but also prevents damaging or non-removable solids from entering the formation with the drilling fluid.

Features of various non-limiting embodiments of the drilling fluid additives of the present invention will now be described. As used herein, the expression "wax or waxy substance" is intended to include the singular as well as the plural since more than one wax or waxy substance may be used in the manufacture of the particles.

The one or more solids can be associated with the wax or waxy substance by any means known in the art so long as the resultant particle provides a drilling fluid additive that is capable of reducing or preventing lost circulation in a drilling operation. For example, one or more solid particulates may be substantially coated or layered with a wax or way substance, or may be combined or blended with a wax or waxy substance, or a combination thereof, to form the particles of the drilling fluid additive. The resultant particle may contain a single solid particulate in association with the wax or waxy substance or may contain multiple solid particulates blended together with a wax or waxy substance. Where the particles contain multiple solids particulates, the solid particulates may be of one or more different types. Where a particle contains multiple solid particulates blended or mixed together with a wax or waxy substance, the blended particles produced may further be coated or layered with a wax or waxy substance. The wax or waxy substance used in the coating or layering may be the same or different from the wax or waxy substance used in constructing the original blended particles. In some cases, the solid particulate itself may be a wax or waxy substance, which can then be blended or coated with a second wax or waxy substance. A solid particulate may also be coated with a layer of wax or waxy substance that contains one or more solid particulates in the coating layer.

Any suitable solid can be utilized in accordance with the invention, for instance, a solid that can be sized, crushed, ground or refined to a desired particle size. The solid may be a known drilling fluid additive, such as a LCM, a lubricant, a viscocifier, a weighting agent, a surface active agent, an emulsifier, an alkalinity control additive, a shale inhibitor, a corrosion inhibitor, or the like. In some embodiments, the solid is a LCM. The solid may also be a material that would not be an effective LCM on its own but is rendered an effective LCM through association with the wax or waxy substance.

Some non-limiting examples of solids that can be used in embodiments of the invention include sawdust or refined wood fibers; ground or refined cellulosic materials such as rice, grain, canola or wood; ground or refined rubber or plastic; plastic or cellophane flakes; gilsonite, asphalt or asphaltenes; solid waxes or waxy substances; various thickening agents or gelling agents; ground coffee grinds, paper, or grass; glass or plastic beads; weighting agents such as barite or calcium carbonate; nut hulls or shells; bagasse fibers; various minerals; course or fine mica; dried drill cuttings, sand or dirt; and the like; including combinations of any of the above.

In some embodiments, the solid is a substantially non-hygroscopic or substantially non-reactive material. It is understood that certain solids may absorb fluid to a mild extent, such as cellulosic materials, but these are considered distinct from hygroscopic or swellable materials, such as swellable polymers and clays, that are commonly used in the industry.

In some embodiments, the solid is an expandable or swellable material, such as a swellable polymer or clay, or a reactive material, such as lime. Prior art additives comprising swellable or reactive materials encapsulated in wax are designed such that the wax coating must dissolve or melt during the treatment operation to release the active component. The wax itself does not serve any function in the additive other than as a temporary encapsulant. In contrast, the wax or waxy material in the additives of the present invention forms a functional component of the particles. The wax or waxy substance preferably remains substantially solid throughout the drilling procedure and imparts desirable characteristics on the solid-containing particles, such as blocking ability or malleability. Through association with the wax or waxy substance, the solid particles gain the ability to join together under temperatures and pressures experienced downhole to form a plug, seal, mat or layer of blocked particles on or in the formation to reduce lost circulation during a drilling operation. It will be understood that the particles are effective in their unblocked form as well since they can still bridge or plug pores in the formation or become integrated into the filter cake.

The presence of the particles in a filter cake can enhance filter cake stability, in part due to the blocking ability of the wax, and can transform the filter cake into a hydrophobic barrier. The hydrophobic barrier properties can inhibit hydration of shales or clays when drilling with an aqueous drilling fluid. The barrier can also prevent passage of fluids and damaging solids into the formation. The presence of wax or waxy material in the filter cake also increases the ability of the filter cake to adhere to the wellbore wall, even if differential pressures are reversed during the operation, for instance, due to movement of the drill string in and out of the hole. This is a significant advantage to operators since most filter cakes dislodge when the drill string is removed from the hole and must be reformed. The particles comprising wax or waxy substance may also reinforce hole stability via malleable insertion of particles into the formation due to mechanical forces or pressure differentials between the well bore fluid and the underground formation. The presence of the wax or waxy substance in the particles also aids in the removal, i.e. geothermal or bacterial, of residual additive from the formation upon completion of the operation. As the wax or waxy substance is melted or degraded, the remaining solids are freed and can be more easily removed from the formation.

Additional benefits may also be realized in utilizing the drilling fluid additives of the invention, such as increased lubricity during drilling. A high temperature wax or waxy substance may be used to enhance storage properties or stability of the particles. For instance a malleable particle can be made comprising a soft wax and solids. The particle can then be coated with a layer of a high melt point wax, such as a polyethylene wax, to substantially prevent blocking of the particles during storage at ambient temperatures.

Figure 1:
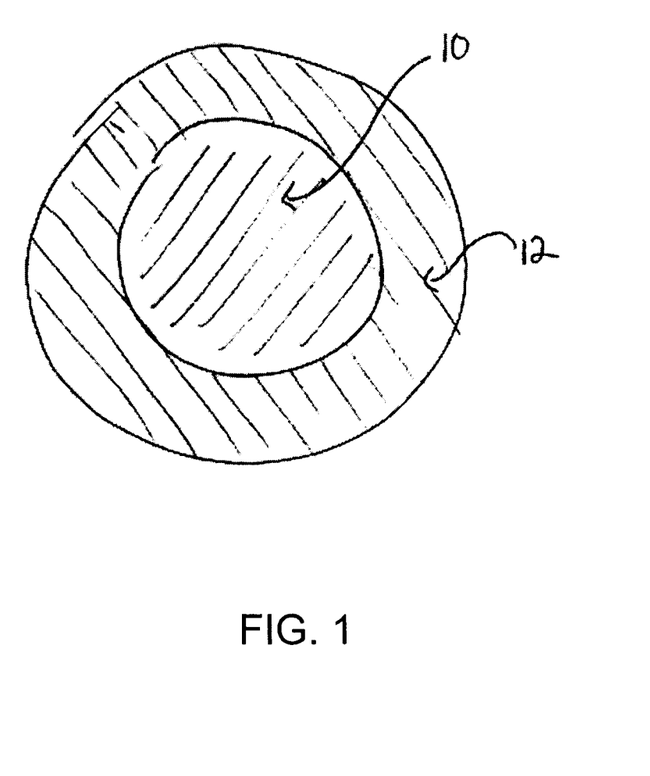
FIG. 1 exemplifies a cross-section of drilling fluid additive in accordance with an embodiment of the present invention, wherein a solid particle (10) is coated with wax (12)

In reference to the figures, FIG. 1 exemplifies a drilling fluid additive, in accordance with an embodiment of the present invention, wherein a single solid particle (10) is coated with wax (12). Coating of the solid with a suitable wax will impart blocking ability onto the solid particle and will also provide a malleable coating. The coating can also be designed to have a selective melt point and hardness. The coating may be of any suitable thickness and may comprise more than one wax or waxy substance or more than one layer.

Figure 2:
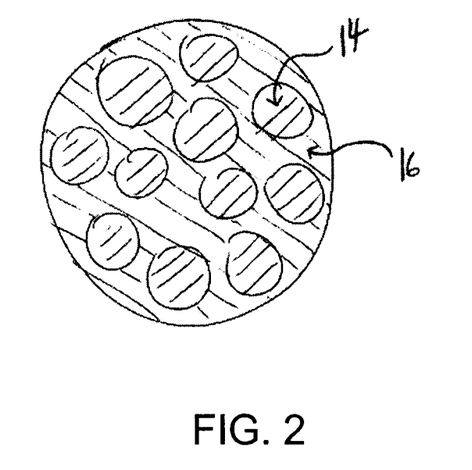
FIG. 2 exemplifies a cross-section of a drilling fluid additive in accordance with an embodiment of the present invention, wherein multiple particles of a solid LCM (14) are combined with a first wax (16) to form a blended particle.

FIG. 2 exemplifies a drilling fluid additive, in accordance with another embodiment, wherein the solid comprises multiple particles of a single solid LCM (14), such as gilsonite, ground nut hulls, calcium carbonate or plastic flakes. The solid LCM is combined with a first wax (16) to form a blended particle having blocking ability. The blended particles can be manufactured into any suitable particle size depending on the specific application.

Figure 3:
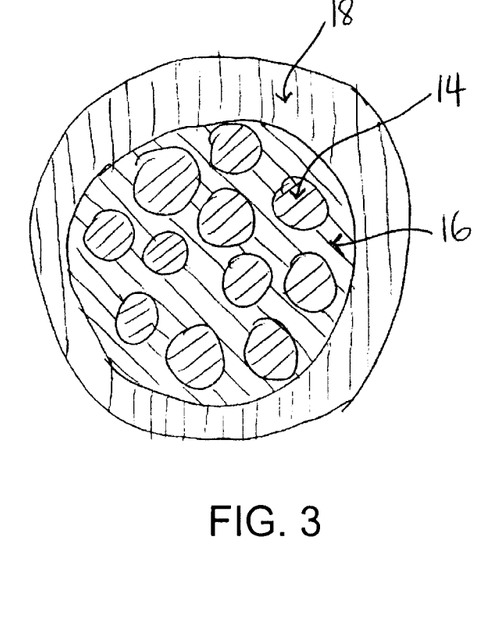
FIG. 3 shows the embodiment of FIG. 2 which is further coated in a layer of a second wax (18) which may be the same or different from the first wax (16)

FIG. 3 shows the embodiment of FIG. 2 further coated in a layer of a second wax (18). The second wax (18) may be the same or different from the first wax (16). The coating may, for example, be a high melting point wax or a synthetic wax to prevent the particles from blocking together on storage at ambient temperature. The particles may then block together at temperatures and pressures experienced downhole to control or reduce lost circulation. The wax that is blended into the particle may optionally have a lower melt point or hardness than the wax coating to promote core deformability.

Figure 4:
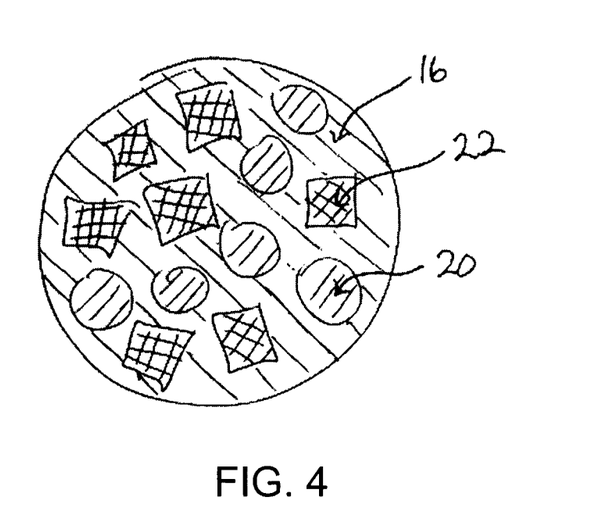
FIG. 4 exemplifies a cross-section of a drilling fluid additive in accordance with an embodiment of the present invention, wherein particles of different solid LCMs (20 and 22) are blended with a first wax (16) to form a blended particle.

FIG. 4 exemplifies a drilling fluid additive, in accordance with another embodiment, wherein particles of different solid LCMs (20 and 22) are blended with a first wax (16) to form a blended particle. In one embodiment, particles of sawdust and gilsonite are blended together with wax to form a blended particle with blocking ability. In another embodiment, particles of gisonite and rice cellulose are blended together with wax to form a blended particle. In yet another embodiment, particles of sawdust, fine drill cuttings and sand are blended together with wax to form a blended particle. Any suitable combination of solids and waxes may be utilized to form the blended particles.

Figure 5:
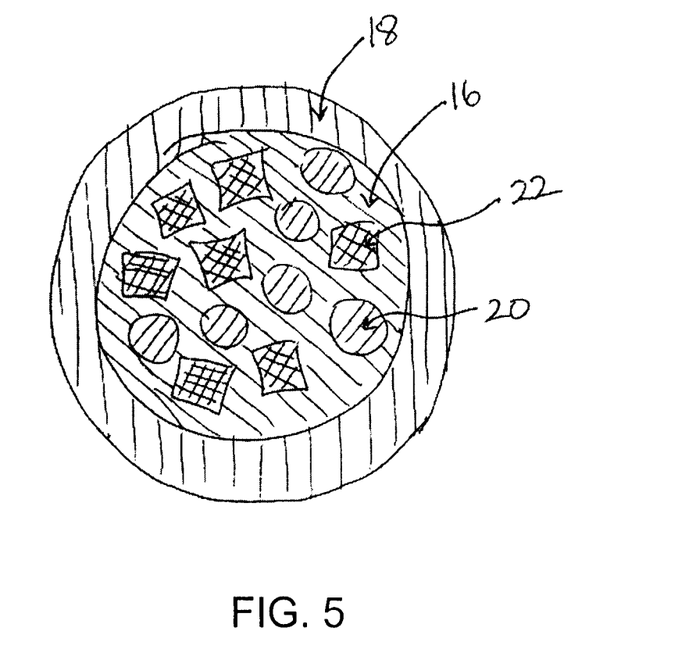
FIG. 5 shows the embodiment of FIG. 4 which is further coated in a layer of a second wax (18) which may be the same or different from the first wax.

FIG. 5 shows the general embodiment of FIG. 4 further coated in a layer of a second wax (18). The wax coating may be the same or different from the first wax (16).

Figure 6:
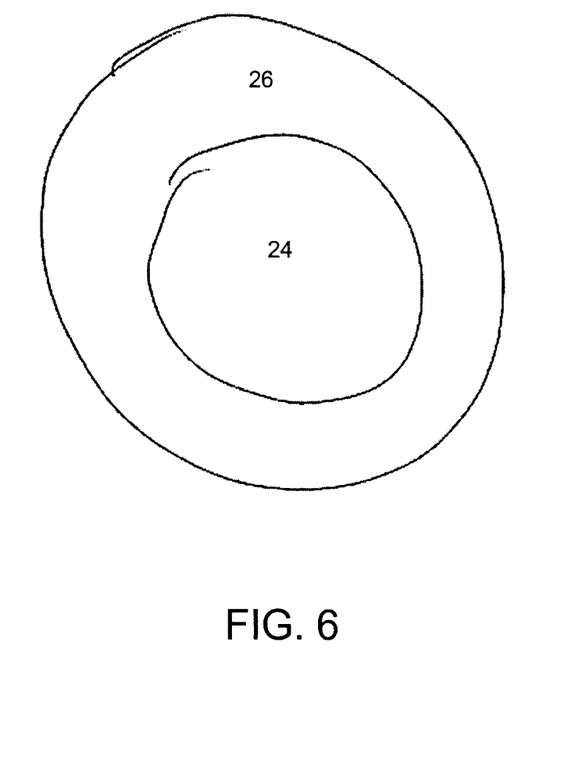
FIG. 6 exemplifies a cross-section of a drilling fluid additive in accordance with an embodiment of the present invention, wherein a solid particle of a first wax (24) is coated with a layer of a second wax (26) having a distinct property from the first wax (24). In one example, the second wax has a higher melt point and hardness than the first wax to promote better storage and handling.

FIG. 6 exemplifies a drilling fluid additive in accordance with an embodiment of the present invention, wherein the solid is a particle of a first wax (24), which is then coated with a layer of a second wax (26). In one embodiment, the second wax has a higher melt point than the first wax to promote better storage and handling. In one embodiment, the first wax is paraffin wax and the second wax is microcrystalline wax which has a higher melt point than the paraffin but still has good malleability and blocking ability. In another embodiment, the first wax is a paraffin wax and the second wax is a high melt point polyethylene wax. Once downhole, blocking of the layered particles is encouraged by the temperatures and pressures to which the particles are exposed. Particles having multiple layers may also be formed, if desired.

In accordance with another embodiment of the invention, blended particles are created with a first wax or waxy substance blended together with a second wax or waxy substance having a different property, to create a tailored particle having properties distinct from either wax or waxy substance alone. The blend may be created by blending solid or softened particles together, or the waxes may be melted and blended together in liquid form followed by solidification of the blended waxes.

Given the diversity in the types of solids and waxes available, the skilled person will be able to create an wide variety of additives in accordance with the invention and will be able to tailor particles for specific applications by selecting materials having the desired properties.

The term wax or waxy substance describes any of a variety of natural or synthetic, oily or greasy, heat-sensitive substances, consisting of, for example, hydrocarbons or esters of fatty acids that are insoluble in water. Waxes are generally hydrophobic or water-repelling. Many waxes are soluble in non-polar organic solvents, such as hydrocarbon, although the degree of solubility varies between waxes. Individual wax properties are determined by molecular size and structure, chemical composition and modification, and oil content. Physical properties that are measured include melt and congealing points, drop melt point, hardness (i.e. needle penetration dmm @ 25° C.), oil content (indicates degree of refining), and kinematic viscosity. Oil content affects the solubility of a wax in an organic solvent. Wax, particularly natural wax, is generally considered non-toxic and biodegradable and therefore presents minimal disposal challenges, presenting a significant environmental benefit and cost advantage to drilling operators since treatment and disposal of drilling waste impacts the cost of the operation.

Natural waxes include waxes derived from animal, vegetable and mineral sources. Animal waxes include, but are not limited to, beeswax, lanolin, lanocerin, and shellac waxes. Vegetable waxes include, but are not limited to, soy, carnauba, candellila, jojoba, flax, sugarcane and ouricouri waxes. Mineral waxes include petroleum waxes and earth or fossil waxes, which include, but are not limited to, paraffin, petrolatum, microcrystalline, semi-microcrystalline, intermediate, ozocerite, ceresine and montan waxes. Montan waxes can be refined from such sources as lignite, humalite or brown coal.

Paraffins are natural waxes that consist mostly of straight chain hydrocarbons, typically in about the $C_{20}$ to $C_{35}$ range, the balance consisting of branched paraffins and cycloparaffins. Paraffin wax is generally non-reactive and non-toxic with good water barrier properties. The melt point of paraffin wax is generally between about 43° C. and about 65° C. (about 100° F. to about 150° C.), and some newer high melt point paraffins have melt points of about 80° C. to about 90° C. (about 176° F. to about 196° F.) or even higher.

Synthetic waxes are man-made waxes and may be derived from such sources as hydrocarbon, alcohol, glycol, amines, amides or esters. They include, but are not limited to, polypropylene, polyethylene, high density polyethylene, polytetrafluoroethylene, Fischer-Tropsch, fatty acid amine, fatty amide, alphaolefin, polyolefin, chlorinated and other chemically modified waxes and polyamide waxes.

A waxy substance is any suitable non-wax substance with wax-like properties. This would include, for example, various polymers.

Waxes or waxy substances suitable for use in accordance with the present invention may be unrefined, semi-refined (about 0.5 to about 1% oil content) or refined (less than about 0.5% oil content) waxes and do not need to be high grade. Highly refined waxes are also suitable. The wax or waxy substance may be a raw wax, a slack wax or a scale wax. Slack wax typically refers to petroleum wax containing anywhere from about 3% to about 15% oil content. Scale wax typically refers to wax containing about 1% to about 3% oil.

The wax or waxy substance may optionally be combined or blended with non-wax components or additives in constructing the particles.

The porosity and permeability of an underground formation, as well as microfractures in a substantially non-permeable formation, should be considered when selecting an appropriate particle size or particle size range. Porosity can be measured in microns and permeability can be measured in darcys. Seepage losses are generally experienced in porous formations having a permeability of greater than about 300 darcys and in fractured formations. The ratio of the size of the particles in the drilling fluid to the pore size of the rock being drilled should also be considered. Generally speaking, when the ratio of particle size to pore size is less than about 1/3, whole mud will pass through the formation, bridging will not occur, and seepage or total losses will be experienced. For example, if the pore size of a formation is 100 microns and the particle size is 25 microns, whole mud loss will typically occur.

The drilling fluid additive may comprise particles of uniform or varying size. The particles may be microparticles or macroparticles. In one embodiment, the particles range from about 0.01 microns to about 40,000 microns in size. In selecting an appropriate particle size range for the particles, any desired lower limit may be combined with any desired upper limit to define a suitable particle size range.

In general, microparticles are more effective for controlling fluid losses to a tight formation where a filter cake is formed. Small macroparticles are also effective. As compared to larger particles, smaller particles and microparticles tend to integrate into the filter cake and can affect the properties of the filter cake being formed, such as increased hydrophobicity, stability and adhesion to the wellbore wall. If the particles are sufficiently small, they can also seal off or enter small pores in the formation while the filter cake is being formed to control the fluid loss and prevent further passage of damaging fine solids into the formation. In some embodiments, particles of less than about 100 microns, or less than about 50 microns, or less than about 10 microns, or less than about 5 microns, or less than about 1 micron are selected for controlling or reducing fluid losses.

In one embodiment, all or a portion of the particles are microparticles or micronized particles. In one embodiment, all or a portion of the particles are less than about 50 microns in size. In one embodiment, all or a portion of the particles range from about 0.01 to about 50 microns, or from about 0.1 to about 40 microns, or from about 0.1 to about 30 microns, or from about 0.1 to about 20 microns, or from about 0.1 to about 10 microns, or from about 1 to about 20 microns, or from about 1 to about 10 microns, or from about 1 to about 5 microns, or from about 5 to about 10 microns. In one embodiment, the particles are less than about 10 microns. In one embodiment, the particles are less than about 5 microns.

In general, macroparticles are more effective for controlling seepage losses since larger particles can bridge pores and fractures in the formation and block together or layer onto the wellbore wall or any filter cake that is being formed to provide a barrier thereon to control or reduce lost circulation. The particles can also enter large pores and fractures in the formation, particularly at areas where no filter cake formation or bridging can occur, and can block together inside the formation to form a plug or seal to control losses. If the particles are slowed down as they are being pressured or deformed into the pores or fractures in the formation, this may aid in promoting agglomeration of the particles at the surface of the loss zone and enable a mat or plug to form against the well bore wall. In some embodiments, particles greater than about 50 microns, or greater than about 100 microns, or greater than about 500 microns, or greater than about 1000 microns, or greater than about 3000 microns, are selected for controlling or reducing seepage losses. Where very large particles are selected, a skilled operator should consider the potential for rejection by solids control equipment.

In one embodiment, all or a portion of the particles are macroparticles. In one embodiment, all or a portion of the particles are greater than about 50 microns. In one embodiment, all or a portion of the particles are from about 50 microns to about 40,000 microns, or from about 100 microns to about 30,000 microns, or from about 100 microns to about 20,000 microns, or from about 100 microns to about 10,000 microns, or from about 100 microns to about 5,000 microns, or from about 100 to about 1000 microns, or from about 100 to about 500 microns, or from about 1000 microns to about 5,000 microns, or from about 2000 microns to about 3000 microns, or from about 400 microns to about 3000 microns, or from about 400 microns to about 800 microns. In one embodiment, all or a portion of the particles are greater than about 100 microns, or greater than about 500, or greater than about 1000 microns, or greater than about 3000 microns, or greater than about 5000 microns.

In one embodiment, the additive comprises a mixture of particles of different particle sizes. The mixture may comprise particles from various size ranges, for example, a portion of the particles may be in the microparticle range with the remaining portion in the macroparticle range. Alternatively, the additive may comprise only microparticles or only macroparticles, selected from two or more particle size ranges. For instance, a first portion of the particles may be in a first particle size range and a second portion may be in a second size range, and so on.

By using a blend of particles of different particle sizes, the added and combined benefits of seepage loss reduction and fluid loss reduction can be achieved. The particles of different particle size may be combined in any suitable ratio. In one embodiment, about ½ of the particles are in the microparticle range and about ½ of the particles are in the macroparticle range. In one embodiment, about ⅓ of the particles are in the 1 to 100 micron range, about ⅓ of the particles are in the 100 to 3000 micron range, and about ⅓ of the particles are in the 3000 to 10000 micron range. The distribution may be defined as a percentage or a ratio. A ratio may be expressed by weight, volume or number of particles. Ratios and percentages are preferably expressed by weight.

In one embodiment, a single intermediate particle size, for example, between about 50 and 200 microns, is selected to control both fluid losses and seepage losses.

It should be noted that particle size does not necessarily refer to rounded particles. The particles can be of any suitable or desired shape, such as spheres, pellets, flakes, slivers, sheets, chunks, chips, or may be irregularly shaped. The term micron is thus used to describe the general size of the particle any may refer to diameter, width, length, cross-section or the like, depending on the shape of the particle, or may be used to describe the dominant dimension of the particle. In some cases, the shape of the particles may reflect the shape of the solid or solids in the additive. For example, a spray-coated flake of plastic may still retain a flake-like shape after coating. A particular shape may be selected for optimum performance in a given operation.

The drilling fluid additive of the present invention may comprise a mixture of different types of particles. The different types of particles may be selected to provide specific functions in the particular drilling operation or formation. The expression different types refers to particles having one or more distinct properties from one another, such as type of solid, type of wax or waxy substance, particle size, particle shape, melt point, solubility, dissolution rate, hardness, blocking ability, or a combination thereof. The melt point, hardness, solubility, dissolution rate, hardness and blocking ability of the particle are generally in reference to the wax or waxy substance present in the particle.

Where the additive comprises more than one distinct type of particle, the particles may be combined in any suitable ratio. For example, where two types of particles are combined, a ratio of about 100:1 to about 1:100, about 25:1 to about 1:25, 10:1 to about 1:10, about 5:1 to about 1:5, or about 2:1 to about 1:2, may be selected. In one embodiment, two types of particles are combined in a ratio of about 1:1 by weight. In another embodiment, two types of particles are combined in a ratio of about 2:1. Where more than two types of particles are combined, any suitable ratio may be selected. In one embodiment, the additive comprises three types of particles combined in a ratio of about 1:1:1.

The melt point, or melting temperature, of a particular wax or waxy substance selected is an important consideration in designing a suitable additive for a particular operation. The additive may comprise a mixture of two or more types of particles having different melt points. Such a mixture can be manufactured by those of skill in the art and tailored to a particular drilling operation and formation. The materials can be selected based on, for example, anticipated operational temperatures, anticipated circulating or static bottom hole temperature, anticipated formation temperatures, or the like.

In accordance with the present invention, the particles remain substantially solid at ambient temperature for ease of handling and storage. Substantially solid in this context means that the particles will not permanently block together or melt under typical storage and handling conditions.

In preferred embodiments, the particles have melt points above typical storage and handling temperatures, for example, above about 25° C., or above about 30° C., or above about 35° C., or above about 40° C., or above about 50° C., or above about 60° C.

If desired, the particles may be treated by means known in the art to improve the storage and handling properties of the particles at ambient temperatures so long as the treatment does not negatively impact the intended function of the particles. In one embodiment, the particles are coated with a high melt point polyethylene wax to prevent blocking at ambient temperatures.

In one embodiment, all or a portion of the particles remain substantially solid throughout the entire drilling procedure. By this it is generally meant that the particles will not dissolve or melt in the drilling fluid or permanently liquefy downhole at the temperatures encountered during the drilling operation, although it is understood that a portion of the wax or waxy substance may soften or temporarily liquefy at areas of higher temperature, such as pinch points between the rotating drill bit cutters and the rock.

In some embodiments, the melt point of the all or a portion of the particles is selected such that it is higher than the expected operational temperatures encountered during drilling—i.e. the temperatures in the circulating drilling fluid, flowlines, drilling equipment, the developing well bore and the circulating bottom hole temperature (BHT)—such that the additive stays substantially solid during the entire drilling procedure. In one embodiment, the particles have a melt point at least about 5° C., or at least about 10° C., higher than the highest operational temperature anticipated during drilling.

In one embodiment, the all or a portion of the particles are substantially insoluble in the drilling fluid at temperatures below the melt point of the particles. This may be achieved, for instance, by selection of a suitable wax or waxy substance. The particles may be designed such that relatively little of the additive will dissolve or melt in the drilling fluid at the temperatures experienced during a typical drilling operation. By substantially insoluble, it is generally meant that less than about 30%, preferably less than about 10%, more preferably less than about 5%, most preferably less than about 1%, of the wax or waxy substance will dissolve in the fluid during the course of a drilling operation when the fluid temperature is below the melt point of the particles.

In one embodiment, all or a portion of the particles are substantially insoluble in hydrocarbons at temperatures below their melt point. This is particularly advantageous when drilling with a hydrocarbon based fluid if it is preferred that the particles remain in a substantially solid form during the drilling operation. Controlling the solubility of the particles in hydrocarbons will also ensure that the formation hydrocarbons do not become excessively contaminated with dissolved wax or waxy substance.

When used in an oil and gas drilling operation, it is preferable that the additives of the present invention have minimal damaging effect on the formation or on well production. To assist in removal of residual additive from the formation upon completion of well drilling, the particles can be designed such that all or a portion of the wax or waxy substance will melt at a geothermal temperature of an underground formation. As used herein, geothermal temperature refers to the natural temperature in an underground formation or at a particular location in an underground formation, such as a production zone. During a drilling operation, the circulating drilling fluid tends to have a cooling effect on the formation such that the temperature of the formation near the wellbore during the operation is cooler than geothermal temperature. In one embodiment, the wax or waxy substance is selected such that the particles have a melt point below the geothermal temperatures expected in the formation, particularly at a production zone. At a production zone, geothermal heat will melt some or all of the wax or waxy substance in the particles, thereby loosening or freeing the solids from the wax, and the fluid or gas pressure from the formation will assist in moving the additive components out of and away from the production zone.

If a wax is selected that has a melt point above the anticipated operational temperatures but below the anticipated geothermal temperature of the formation, particularly at a production zone, the wax will remain substantially solid during the drilling operation but will later be removable from the formation with the assistance of geothermal heat. For instance, if the highest operational temperature anticipated during drilling is about 60° C. and the geothermal formation temperature at a production zone is expected to be about 90° C., that particles could be engineered to have melt points at least about 5° C. above the operational temperature and at least about 5° C. below the geothermal temperature, or between about 65° C. and about 85° C. in this example.

If geothermal removal of residual additive is desired, all of the particles will have a melt point less than the formation temperatures expected, particularly at production zones. Bacterial removal is also an option.

If the wax or waxy substance selected is also substantially insoluble in hydrocarbons, any residual wax will be easily removable from recovered hydrocarbons at temperatures below melt point. Different waxes and waxy substances have different solubility in hydrocarbon fluids and smaller wax particles tend to have higher rates of dissolution than larger particles. The dissolution rates of wax particles in hydrocarbon are affected by previous exposure of the oil to wax having a saturation effect. Thus, the dissolution rate of additive that is added to a recycled base oil or invert fluid can be decreased compared to the dissolution rate in fresh oil due to the saturation effect of finely dispersed or dissolved wax in the recycled fluid.

A skilled person can anticipate the temperatures that will be encountered in a given drilling operation based on past experience and records from a particular drilling location. The temperature in the wellbore typically increases as the well deepens or as the permeability of the formation decreases, although hot spots may be encountered where the temperature can exceed the deepest well temperature, or bottom hole temperature (BHT). A typical BHT in Western Canada is between about 55° C. to about 90° C., and is generally about 65° C. Temperatures at the surface are generally about 15° C. lower. The particles may be manufactured to have a melt point above anticipated BHT, for example, at least about 5° C. above BHT, at least about 10° C. above BHT, at least about 30° C. above BHT, or at least about 90° C. above BHT. The higher the anticipated BHT, the higher the melting point of the selected wax or waxy substance, if the material is to remain substantially solid during the drilling operation. In one embodiment, all or a portion of the particles have a melt point above about 40° C., or above about 65° C., or above about 70° C., or above about 85° C.

In some embodiments, all or a portion of the particles have melt points in the range of about 10° C. to about 180° C., or about 30° C. to about 160° C., or about 60° C. to about 160° C., or about 65° C. to about 160° C., or about 70° C. to about 160° C., or about 80° C. to about 150° C., or about 85° C. to about 140° C., or about 90° C. to about 140° C. In one embodiment, all or a portion of the particles have melt points between about 65° C. and about 95° C. In one embodiment, all or a portion of the particles have a melt point between about 69° C. and about 95° C.

In certain embodiments, waxes having a melt point of 65° C. or above are preferred for drilling operations where the BHT is anticipated to be about 65° C. or lower.

Although there is no absolute upper limit for the melt point of the particles, other properties of the wax or waxy substance, such as hardness, may be affected as the melt point increases and should be considered in engineering the particles.

In preferred embodiments, all or a portion of the particles exhibit a blocking effect at temperatures or pressures encountered downhole, wherein the particles join together to form layers, stacks, chunks, blocks or other formations. Blocking ability is determined by the properties of the particular wax or waxy substance selected and may be encouraged by heat, momentum, or pressure generated during the drilling process.

The blocking ability of the particles plays a role in determining the malleability or deformability of the particles and the ability of the particles to deform to fit into pores or fractures in the formation or to smear onto the well bore wall or filter cake. Generally speaking, softer waxes exhibit better blocking ability than harder waxes. The relative hardness or softness of a particular wax will of course be affected by the temperatures to which the material is subjected. Other factors can also affect blocking ability. For instance, the shape of the particle can affect blocking ability, wherein the present inventor has found that the blocking ability of a harder wax can be increased if the surface area of the particle is increased, such as by changing the shape from a round bead to a thin grated flake.

It is thus important to select a wax or waxy substance that has a suitable hardness for a particular application. Hardness can be measured in a standardized needle penetration test and may be expressed in units of needle penetration (dmm) at 25° C., where a lower hardness value represents a harder material. In certain embodiments, all or a portion of the particles have a hardness of less than about 25 dmm at 25° C., or less than about 20 dmm at 25° C., or less than about 15 dmm at 25° C., or less than about 10 dmm at 25° C., or less than about 5 dmm at 25° C., or less than 4 dmm at 25° C., or less than about 2 dmm at 25° C., or less than about 1 dmm at 25° C.

The tackiness of a given wax or waxy substance is another factor that may be considered in selecting a suitable wax or waxy substance for use in accordance with the present invention.

It is within the ability of a skilled person to select a material or materials having suitable properties for a given operation based on the teachings herein and common general knowledge.

A wide variety of waxes and waxy substances are available with a wide range of physical and chemical characteristics for engineering particles having optimum performance for a particular operation. Waxes and waxy substances may be provided by any suitable supplier. Two exemplary suppliers include International Group Inc. (IGI), Ontario, Canada, and Marcus Oil and Chemical (Marcus).

Non-limiting examples of commercially available waxes suitable for use in accordance with the present invention are illustrated below.

Examples of Refined Parrafin Waxes

| Melt Point (° C.) | Typical Hardness (dmm @ 25° C.) | Supplier | Supplier Product Code |
|---|---|---|---|
| 53.9 | 17 | IGI | IGI 1070A |
| 54.4 | 14 | IGI | IGI 1230A |
| 55.6 | N/A | IGI | IGI 1236A |
| 54.4 | 12 | IGI | IGI 1325A |
| 58.9 | 12 | IGI | IGI 1239A |
| 57.8 | 11 | IGI | IGI 1240A |
| 59.4 | 11 | IGI | IGI 1242A |
| 60 | 13 | IGI | IGI 1245A |
| 61.4 | 11 | IGI | IGI 1250A |
| 60 | 12 | IGI | IGI 1302A |
| 58.9 | 13 | IGI | IGI 1343A |
| 67.8 | 14 | IGI | IGI 1303A |
| 67.2 | N/A | IGI | IGI 1380A |
| 69.4 | 12 | IGI | IGI 1260A |

N/A = information not available

Examples of Microcrystalline Waxes

| Melt Point (° C./° F.) | Hardness (dmm at 25° C.) | Supplier | Supplier Product Code |
|---|---|---|---|
| 60/140 | 40 | IGI | MICROSERE 5788A |
| 70/160 | 28 | IGI | MICROSERE 5701A |
| 70/160 | 28 | IGI | MICROSERE 5714A |
| 77/170 | 28 | IGI | MICROSERE 5715A |
| 77/170 | 28 | IGI | MICROSERE 5799A |
| 83/181 | 18 | IGI | MICROSERE 5818A |
| 83/181 | 18 | IGI | MICROSERE 5871A |
| 83/181 | 18 | IGI | MICROSERE 5890A |
| 84/183 | 14 | IGI | MICROSERE 5981A |
| 87/188 | 18 | IGI | MICROSERE 5897A |
| 87/188 | 18 | IGI | MICROSERE 5896A |
| 89/192 | 9 | IGI | MICROSERE 5901A |
| 90/194 | 8 | IGI | MICROSERE 5999A |
| 90/194 | 8 | IGI | MICROSERE 5909A |
| 90/194 | 8 | IGI | MICROSERE 5910A |

Examples of Soy and Palm Waxes

| Melt Point (° C./° F.) | Hardness (dmm at 25° C.) | Supplier | Supplier Product Code |
|---|---|---|---|
| 59.4/139 | 13 | IGI | IGI R2322A |
| 53.9/129 | 11 | IGI | IGI R2778A |
| 57.2/135 | 9 | IGI | IGI R2779A |

Examples of Polyethylene Waxes

| Mettler Drop Point (° C.) ASTM D3954 | Hardness (dmm at 25° C.) ASTM D1321 | Supplier | Supplier Grade Code |
|---|---|---|---|
| 118 | 2-3 | Marcus | M200 |
| 118 | 2-3 | Marcus | M300 |
| 118 | 2-3 | Marcus | M500 |
| 106 | 2-3 | Marcus | MC6 |
| 98 | 2-3 | Marcus | MC16 |
| 112 | 4 | Marcus | M3300 |
| 112 | 4 | Marcus | M3400P |
| 112 | 4 | Marcus | M3400T |
| 112 | 5 | Marcus | M3500 |
| 137 | <0.5 | Marcus | MC330 |

Other suitable waxes include various wax products sold for industrial and cosmetic applications.

In one embodiment, all or a portion of the particles comprise a vegetable or mineral wax or a derivative thereof. In one embodiment, the vegetable wax is refined soy wax having a melt point above 65° C. (ex. Marcus N5010) or a vegetable wax product having a melt point above 65° C. (ex. Marcus NAT 180).

In one embodiment, the mineral wax is a paraffin wax or a microcrystalline wax. In one embodiment, the particles comprise refined or highly refined paraffin or microcrystalline wax. In one embodiment, all or a portion of the particles comprise refined or highly refined paraffin wax. In one embodiment, all or a portion of the particles comprise microcrystalline wax.

In one embodiment, all or a portion of the particles comprise refined paraffin wax having a melt point between about 60° C. and about 70° C. In one embodiment, the wax is a refined paraffin wax that is substantially insoluble in hydrocarbon-based drilling fluid below its melt point.

In one embodiment, the wax or waxy substance is oil soluble. This embodiment is more suited for drilling with a water based drilling fluid.

In certain embodiments, the additives have low density and do not require oil-wetting additives for addition to the drilling fluid.

In certain embodiments, the particles comprise a high density solid, such as calcium carbonate or barite.

In one embodiment, the particles comprise calcium carbonate coated with a refined paraffin wax. This embodiment would be suitable for a production zone where acid soluble materials are preferred. A significant disadvantage of calcium carbonate as a LCM is that inverts can pass easily through this porous type of rock. Providing a wax coating on the particles, in accordance with an embodiment of the present invention, enhances the performance of the calcium carbonate product as a lost circulation material by imparting blocking ability on the new particles and also restricts the passage of inverts through the calcium carbonate. The wax can be selected based on melt point such that the wax coating will melt in the formation upon completion of the operation due to geothermal heat. The operator can then acidize the calcium carbonate for removal.

In one embodiment, barite particles are coated in wax to control lost circulation in a drilling operation where it is also desirable to weight up the drilling fluid to control formation pressures or hold back sloughing shale. Combining denser or heavier solids with the waxy material can improve the dispersion of the particles.

In one embodiment, the particles comprise a blend of two or more waxes. In one embodiment, the particles comprise two or more of paraffin, microcrystalline and polyethylene waxes.

In one embodiment, the solid is a first wax or waxy substance, which is blended or coated with a second wax or waxy substance having a different property from the first wax or waxy substance, such as wax type, melt point, dissolution rate, or hardness, to form a single particle comprising more than one wax or waxy substance and having properties unique from either wax alone.

In one embodiment, 200-500 micron particles comprising paraffin and polyethylene waxes were produced by blending the two waxes together. The particle therefore consisted of a soft paraffin wax with a hard high melt point polyethylene wax, resulting in a solid particle having properties distinct from either wax alone. The particles exhibited good storage properties.

In one embodiment, a first refined paraffin wax (+−65° C. MP, 11-14 mm penetration) was blended with a second refined paraffin wax (+−69.4° C. MP, 12-18 mm penetration) to provide a blended particle having properties distinct from either wax alone. In one embodiment, the waxes were combined in a ratio of about 2:1.

In one embodiment, the drilling fluid additive comprises a blend of paraffin and microcrystalline waxes in a single particle, thereby producing a blended particle having unique properties. In one embodiment, the blend is a mixture of paraffin wax (+−65° C. MP, 11-14 mm penetration) and microcrystalline wax (+−90° C. MP, 14-18 mm penetration).

Two or more waxes may alternatively be layered rather than blended together.

In one embodiment, paraffin wax (65° C. MP, 11-14 mm) particles are coated with microcrystalline wax (90° C. MP, 14-18 mm penetration). The higher melt point of the microcrystalline wax helps discourage blocking during storage.

In preferred embodiments, the drilling fluid additives are non-toxic and biodegradable with no handling or disposal issues.

The ratio of solids to wax or waxy substance in the particle may be any suitable ratio, for example, 1:100 to 100:1 by weight. The amount of wax or waxy substance relative to the amount of solid in the particle may also be described as a percentage, wherein the wax or waxy substance may represent, for example, 1% to 100% of the weight of the particle. In some embodiments, the wax or waxy substance is present in a minimal effective amount, for instance a minimal amount to impart blocking ability, meltability or deformability onto the new particles. The minimal amount may, for example, be from about 1% to 50%, or about 5% to 40%, or about 10% to 30%, by weight of the particle. Bringing the wax content down as low as possible will reduce the cost of the particle in many cases, since waxes can be costly, while still rendering an effective lost circulation material.

In one embodiment, a batch of wax-coated sawdust particles was less costly to manufacture than a batch of solid wax particles and was more effective as a LCM than uncoated sawdust (see Example 2). Similar results were seen for coated cellophane flakes and walnut shells.

The improved drilling fluid additive may be manufactured by any suitable means known to those skilled in the art. The solids may first be sized, ground or refined by any suitable means. The solids may then be blended with the wax or waxy substance by any means, for example, by melting the wax or waxy substance and mixing in the solids and then shearing the blended particles as the wax or waxy substance cools. The particles can be sized or shaped by any suitable means, such as shearing or grating. Coatings may be added, for example, using spray-coating, cold-spraying, spray-drying, or dip methods.

Where the additive comprises a mixture of particle types, the individual particle types may be manufactured or sold as a blend of particles, or the particle types may be manufactured or sold individually and mixed by a purchaser, operator or user prior to use or during the drilling operation. The different particles types do not need to be mixed together per se but may be added to the circulating drilling fluid or downhole in various relative proportions or ratios throughout the course of the entire drilling operation.

A limitless range of drilling fluid additives can be constructed in accordance with the present invention since any suitable solid, including currently available solid drilling fluid additives, may be associated with any suitable wax or waxy substance to construct a particle that is capable of reducing or controlling lost circulation. Furthermore, more than one different type of particle may be combined to take advantage of different properties of the particles, such as particle size, blocking ability, hardness, tackiness and melt point. A person skilled in the art, having regard to the teachings herein, can select an appropriate combination of solids and waxes or waxy substances for use in manufacturing drilling fluid additives of the present invention having characteristics suited for a particular drilling operation.

Selection of an appropriate solid or wax will depend on a number of factors, including the properties of raw materials, the properties of the fircal particles, the properties of the base fluid or drilling fluid, the structure and porosity of the underground formation, the anticipated circulating bottom hole temperature, and the anticipated formation and operational temperatures. The characteristics of the additive downhole can be influenced by selecting waxes or waxy substances having desired properties, such as melt point, hardness, or dissolution rate in a given drilling fluid.

The drilling fluid additives created can be used for a range of lost circulation problems, from fluid losses, to seepage losses and total losses. The term lost circulation, as used herein, encompasses fluid losses or seepage losses or total losses and the drilling fluid additives can be optimized for these different applications, as will be understood by a person skilled in the art and explained above.

The present invention also relates to a drilling fluid comprising one or more additives of the invention. The drilling fluid into which the additive is suspended or dispersed may be aqueous based, oil based, synthetic based or an emulsion. The emulsion may be a water-in-oil or an oil-in water ("invert") emulsion. The drilling fluid may also be a well kill fluid, which is a drilling fluid with a density great enough to produce a hydrostatic pressure to substantially shut off flow into a well from an underground formation. While the emphasis is placed on drilling fluids, the additive may be added to other well treatment fluids in any process where reduction or control of lost circulation is desired, and such use of the additives is contemplated as falling within the scope of the invention. For example, the additive may also be added to a completion brine or other well treatment fluid.

The additive may be mixed with or added to a drilling fluid or a base fluid. The additive may be added to a base fluid and stored prior to use, for example, as a mixture, dispersion or suspension. The additive may be added to a fluid prior to drilling, such as in mixing tanks, or while drilling ahead, or a combination of the above. The additive may be spotted downhole in pill form during drilling. The additive may be dispersed or suspended in a suitable carrier liquid prior to being added to a base fluid or a drilling fluid.

In one embodiment, the drilling fluid is viscosified. The inventor has found that viscosifying the drilling fluid enhances dispersion or suspension of the particles. It has also been found that the drilling fluid can be effectively viscosified with a wax or waxy substance, which may be in the form of dissolved or liquified wax or fine particles. In one embodiment, the drilling fluid is viscosified using wax or waxy substance.

The drilling fluid may optionally include one or more other additives or inhibitors used in the industry to control the properties of the fluid or enhance performance during the operation. The drilling fluid additive may be added to a base fluid or drilling fluid prior to or after the addition of other additives using methods known to those skilled in the art. The additive may be added at any stage in the formulation of the drilling fluid composition.

Additives for drilling fluids fall into several basic groups. These include, but are not limited to, lost circulation materials; viscosifiers; weighting additives; surface active additives; emulsifiers; oil wetting additives; alkalinity control additives; thinners or dispersants; flocculants; defoamers; lubricants; shale inhibitors; and corrosion inhibitors.

In one embodiment, the drilling fluid additive of the invention is the only LCM in the drilling fluid. In many embodiments, and depending on the raw materials selected for the construction of the additives, the additives of the present invention are safer and less damaging to the formation and the formation resource than many common lost circulation materials. Most waxes are considered non-toxic and biodegradable and therefore present minimal disposal challenges, a significant advantage to drilling operators.

In one embodiment, the drilling fluid additive is dispersed in the fluid without the use of additional stabilizers, surface active agents or emulsifiers, which can negatively impact both the drilling fluid and the drilling process and which tend to be expensive and environmentally unfriendly. It was previously thought that waxy particles could not be effectively dispersed in a drilling fluid, particularly an aqueous based fluid, without the use of such agents. However, the present inventor has found that the additives of the present invention can be effectively dispersed in a circulating drilling fluid without the use of such agents. This presents an economic and environmental advantage and also satisfies a desire in the industry to minimize the amount of different additives in the drilling fluid. Of course, such agents can still be used if desired.

In certain embodiments, the drilling fluid additive is present in a drilling fluid at an average concentration of about 0.01 kg/m$^3$ to about 500 kg/m$^3$ throughout the drilling operation. In referring to the concentration, the volume refers to the volume of fluid before addition of the additive, i.e. add 10 kg to 1 m$^3$ of fluid for 10 kg/m$^3$. The amount of additive added to the fluid, and the rate at which it is added, will depend on the operation and the expected characteristics of the formation, or real-time lost circulation experienced at a particular location in the formation. It is considered within the ordinary ability of a person skilled in the art to select an appropriate concentration of additive and a suitable addition regimen for a given drilling operation and formation.

In certain embodiments, the concentration of additive in a drilling fluid may range from about 1 kg/m$^3$ to about 200 kg/m$^3$, from about 1 kg/m$^3$ to about 100 kg/m$^3$, from about 1 kg/m$^3$ to about 50 kg/m$^3$, from about 5 kg/m$^3$ to about 30 kg/m$^3$, or from about 5 kg/m$^3$ to about 20 kg/m$^3$. In some embodiments, a concentration of less than 50 kg/m$^3$ in the drilling fluid is preferred for minimal effect on the drilling fluid or the drilling operation.

The fluid may optionally be subjected to treatment, such as mixing, agitation or shearing, prior to use. Such treatment may have the effect of further dispersing the particles or may alter the particles somewhat. Such alterations occurring after the additive is added to the fluid are considered within the scope of the invention as herein described, to the extent that the drilling fluid is not negatively impacted by such treatment.

The present invention also relates to a method of reducing or controlling lost circulation in a drilling operation. In the oil and gas industry, the drilling operation will typically involve the drilling of a well into an oil or gas bearing subterranean formation.

The general method involves adding the drilling fluid additive of the present invention to a drilling fluid, and using the drilling fluid comprising the additive in a drilling procedure to reduce or control lost circulation.

The method may be a preventive method, a treatment method, or a combination of both. In a preventive method, the additive can be added to the base fluid or drilling fluid prior to drilling or prior to reaching an anticipated loss zone. This is especially useful in cases where high losses are anticipated prior to drilling. In a treatment method, the additive can be added to the drilling fluid while drilling ahead particularly when real time losses are experienced.

The drilling fluid additive may be added to mixing tanks prior to circulation, or may be added while drilling ahead. The additive may be added as a single addition prior to drilling, or may be added continuously or intermittently throughout the operation. The drilling fluid additive may be added slowly while drilling ahead or in heavy sweeps and pill additions, or a combination thereof.

In one embodiment, the drilling fluid additive is continually mixed into the drilling fluid. Higher volumes of the drilling fluid additive or higher rates of addition are generally used to counteract higher losses. The rate and route of addition can be adjusted throughout the drilling procedure to account for changes anticipated or encountered throughout the procedure.

Typically, an initial volume of additive is added to the base fluid or drilling fluid prior to drilling and additional volumes are added throughout the drilling operation, as needed. The concentration of additive in the drilling fluid is adjusted throughout the procedure to account for sudden changes in lost circulation that are experienced. In the event of anticipated or "real-time" surges in lost circulation, pill volumes or discrete high concentration of the additive are added to the drilling fluid and pumped downhole.

The drilling fluid containing the additive can be spotted to a particular location in the hole where needed, or circulated into the hole through the circulating system. By spotted, it is generally meant that the drilling fluid is delivered directly to a desired area of the well bore or formation where lost circulation is anticipated or experienced. The drilling fluid additive may also be suspended or dispersed in a carrier fluid and added directly into the hole.

The drilling fluid additive may be mixed directly into the active circulating drilling fluid at a rate of about 0.01 kg to about 100 kg per minute while drilling ahead. Alternatively, the additive may be mixed into a holding tank or premix tank containing base fluid or drilling fluid, for example, in a concentration range from about 0.01 kg/m$^3$ to about 500 kg/m$^3$.

In the field, the drilling fluid additive is not necessarily added based on a typical concentration range given the fact that not all of the material stays in the system. Some of the additive can be lost to the formation or removed by solids control equipment on return to the surface for instance. Operators are familiar with this and can adjust the addition regime accordingly throughout the procedure. The additive may be added in units of sacks per meters drilled. The skilled operator knows the rate of drilling and can easily calculate how fast to add the material or when to spot the material to a particular location, such as a loss zone, during the operation.

The drilling fluid additives of the present invention may be utilized with any suitable drilling fluid system. Examples of industry recognized mud systems include but are not limited to, hydrocarbons; invert emulsions, which are hydrocarbon based; aqueous based systems; aqueous based emulsions; potassium chloride or potassium sulfate systems, which are water based; silicate systems, which are water based; amine systems, which are fully disposable; PHPA or polyacrylamide systems, which provide shale inhibition and are fully disposable; and synthetic systems. Each type of system has its own advantages and disadvantages, as will be appreciated by the person skilled in the art.

Primary advantages to be achieved by the method of the invention include reductions in fluid losses and seepage losses experienced during drilling. Other potential advantages include, but are not limited to, increased filter cake stability and adhesion of the filter cake to the well bore, increased lubricity, increased hole stability, formation of a hydrophobic barrier, decreased hydration of shales and clays, and decreased penetration of damaging solids into the formation.

The drilling fluid additive of the present invention is suitable for use in various drilling procedures and operations, including vertical well drilling, horizontal well drilling, or directional well drilling. The drilling operation may be an oil and gas operation, a mining operation, or another operation where drilling is utilized and where reduction or control of lost circulation is desired. The additives are useful in drilling operations on land. In certain embodiments, the additive is suitable for offshore drilling applications, provided the materials selected meet the strict toxicity standards required for offshore operations. The drilling fluid additives described herein are also suitable for drilling under difficult hole conditions, such as in unstable or underpressured formations, due to the many advantageous properties described above.

EXAMPLE 1

Gilsonite Coated with Refined Paraffin Wax

Fine gilsonite particles (2-20 microns) were coated with refined paraffin wax. The fine solids responded well to the coating. The new coated particles blocked together under pressure and quickly sealed off a test 200 mesh test screen having 74-micron holes. It should be noted that the coated particles were smaller than the holes in the test screen When attempts were made to remove the particles from the test screen in a standard manner using heated water, it became evident that the seal was surprisingly heat resistant with the coated particles compared to the uncoated particles and the heat actually seemed to reinforce the seal, possibly due to enhanced blocking properties of the wax. The test was a back flush test so the particles did not have to go through the screen and yet they still were resistant to removal, indicating the effective ability of the coated particles to seal off a loss zone and also to form a stable seal even when the pressure was reversed, thereby demonstrating that the coated particles can also function to stabilize a filter cake and promote adherence to a well bore wall even as the pressures are reversed downhole, such as with movement of the drill string in an out of the hole. This is a significant advantage over traditional solids.

The new wax-coated particles showed significantly improved performance as a LCM compared to gilsonite alone, and were more economical to produce than solid paraffin particles. Similar results were seen with rice cellulose.

EXAMPLE 2

Permeability Plugging Tests Comparing Uncoated Solids and Wax-Coated Solids

Three different solid lost circulation materials (LCMs), intended for use to prevent or control drilling fluid losses to underground formations, were compared using a slotted disc in a permeability plugging apparatus in both their original form and with the LCMs coated in wax or waxes. The LCMs tested were sawdust, Celloflake™, and walnut shells. The selected LCM's were coated with IGI 1297 Paraffin Waxes then re-tested in order to assess the effects of association of the solids with wax to form wax-coated particles.

A slotted test disc was prepared for the PPT by cutting a 35 mm long by 2.5-3 mm wide slot into a porous ceramic disc to simulate a pore or fracture in a formation. The PPT disc was then made water tight by immersing in a high temperature molten wax, leaving only the slot available for the passage of fluid containing the LCM. Fluid samples were tested with addition of the LCMs in an attempt to seal the slot under pressure. The disc was prepared as closely as possible to API specifications for this type of LCM testing. The base fluid used in the tests was prepared in accordance with API specifications for this type of testing. A gel slurry composed of 6.8% bentonite by mass was prepared and found to have an apparent viscosity (AV) of 25 mPa·s.

Each LCM sample was tested in the base fluid sample with a loading of 40 kg/m$^3$, at room temperature. The time required to seal the slot (with a 6900 kPa pressure minimum) and volume of fluid passed through the slot before sealing were recorded. The pressure was then held at 6900 kPa for 10 minutes to verify that the seal could be maintained.

The results obtained during testing of the LCM's are organized shown below.

| PPT Test Results | | | |
|---|---|---|---|
| LCM | Time Required to Seal Slot (s) | Effluent Volume (mL) | 10 min, 6900 kPa Pressure Test |
| Sawdust | 60 | 15 | no pressure drop |
| Wax-Coated Sawdust | 20 | <1 | no pressure drop |
| Celloflake ™ | 80 | 16 | 690 kPa drop @ 8 minutes |
| Wax-Coated Celloflake ™ | 12 | 5.8 | no pressure drop |
| Walnut Shell | 146 | 51 | 690 kPa drop @ 9 minutes |
| Wax -Coated Walnut Shell | 5 | <1 | 690 kPa drop @ 8 minutes |

The wax-coated sawdust showed a 67% reduction in the time to seal the slot and greater than 93% reduction in lost circulation compared to the uncoated LCM. The wax-coated Celloflake™ showed an 85% reduction in time to seal the slot and a 64% reduction is fluid loss compared to the uncoated LCM. The wax-coated walnut shells showed a 97% reduction in time to seal the slot with greater than 98% reduction in fluid loss compared to the uncoated LCM. The performance of the coated LCMs was clearly enhanced by the wax coating.

The ability to form a fast seal represents a significant advantage in the field since considerably less fluid will be lost to the formation during drilling. The formation of a fast seal will also reduce the amount of damaging solids that can enter the formation with the drilling fluid. The LCMs tested above are rendered less damaging to the formation by the association with wax since the wax can be selected such that it will melt or degrade, i.e. by geothermal heat or bacterial degradation, upon completion of the operation, thereby loosening or freeing the solids for ease of removal.

The above-described embodiments of the invention are intended to be examples only. Alterations, modifications and variations can be effected to the particular embodiments by those of skill in the art without departing from the scope of the invention, which is defined solely by the claims appended hereto.

The invention claimed is:

1. A drilling fluid additive for reducing or controlling lost circulation in a drilling operation, the drilling fluid additive comprising one or more lost circulation materials defined by final size particles, with the final size particles being blended, mixed, coated and/or layered with one or more waxes and/or waxy substances, the one or more lost circulation materials being substantially non-hygroscopic and substantially non-reactive under drilling conditions, the one or more waxes and/or waxy substances being selected such that the drilling fluid additive remains substantially solid and exhibit a blocking effect at temperatures or pressures encountered downhole during the drilling operation.

2. The drilling fluid additive of claim 1, wherein the lost circulation material is selected from the group consisting of sawdust, refined wood fibers, ground or refined cellulosic materials, ground or refined rubber or plastic, plastic or cellophane flakes, gilsonite, asphalt, asphaltenes, waxes, thickening agents, gelling agents, coffee grinds, paper, grass, glass or plastic beads, weighting agents, nut hulls or shells, bagasse fibers, minerals, course or fine mica, dried drill cuttings, sand or dirt, and combinations thereof.

3. The drilling fluid additive of claim 1, wherein the one or more waxes and/or waxy substances is selected from natural and synthetic waxes.

4. The drilling fluid additive of claim 3, wherein the one or more waxes and/or waxy substances includes natural wax selected from the group consisting of paraffin wax, microcrystalline wax, and combinations thereof.

5. The drilling fluid additive of claim 3, wherein the one or more waxes and/or waxy substances includes synthetic wax defined by polyethylene wax.

6. The drilling fluid additive of claim 1, wherein the particles comprise microparticles less than about 50 microns in size.

7. The drilling fluid additive of claim 1, wherein the particles comprise macroparticles greater than about 50 microns in size.

8. The drilling fluid additive of claim 1, wherein the one or more waxes and/or waxy substances is selected such that all or a portion of the particles are substantially insoluble in hydrocarbon-based drilling fluid at temperatures below the melt point of the particles.

9. The drilling fluid additive of claim 1, wherein the one or more waxes and/or waxy substances is selected such that all or a portion of the particles will melt at a geothermal temperature in an underground formation or at a production zone in an underground formation for geothermal removal.

10. The drilling fluid additive of claim 1, wherein the drilling fluid additive is biodegradable.

11. The drilling fluid additive of claim 1, wherein the final size particles constitute a mixture of particles of different sizes.

12. The drilling fluid additive of claim 11, wherein the mixture of particles includes both microparticles and macroparticles.

13. The drilling fluid additive of claim 12, wherein the particles include only the microparticles.

14. The drilling fluid additive of claim 13, wherein the particles include only the macroparticles.

15. A drilling fluid comprising a drilling fluid additive for reducing or controlling lost circulation in a drilling operation, the drilling fluid additive including one or more lost circulation materials defined by final size particles, with the final size particles being blended, mixed, coated and/or layered with one or more waxes and/or waxy substances, the one or more lost circulation materials being substantially non-hygroscopic and substantially non-reactive under drilling conditions, the one or more waxes and/or waxy substances being selected such that the drilling fluid additive remains substantially solid and exhibit a blocking effect at temperatures or pressures encountered downhole during the drilling operation.

16. The drilling fluid of claim 15, wherein the drilling fluid is hydrocarbon based, aqueous based, synthetic based, or an emulsion.

17. The drilling fluid of claim 16, wherein the drilling fluid is aqueous based.

18. The drilling fluid of claim 17, which is fully disposable.

* * * * *

UNITED STATES PATENT AND TRADEMARK OFFICE
CERTIFICATE OF CORRECTION

| | | |
|---|---|---|
| PATENT NO. | : 8,607,895 B2 | Page 1 of 1 |
| APPLICATION NO. | : 12/667952 | |
| DATED | : December 17, 2013 | |
| INVENTOR(S) | : Hoskins | |

It is certified that error appears in the above-identified patent and that said Letters Patent is hereby corrected as shown below:

On the Title Page, item (56)

On page 2 of the issued patent, under Foreign Patent Documents, "CA 2161799 10/1994" should be changed to --CA 2161779 10/1994--.

Signed and Sealed this
Sixteenth Day of June, 2015

Michelle K. Lee
*Director of the United States Patent and Trademark Office*